United States Patent Office 3,412,622
Patented Nov. 26, 1968

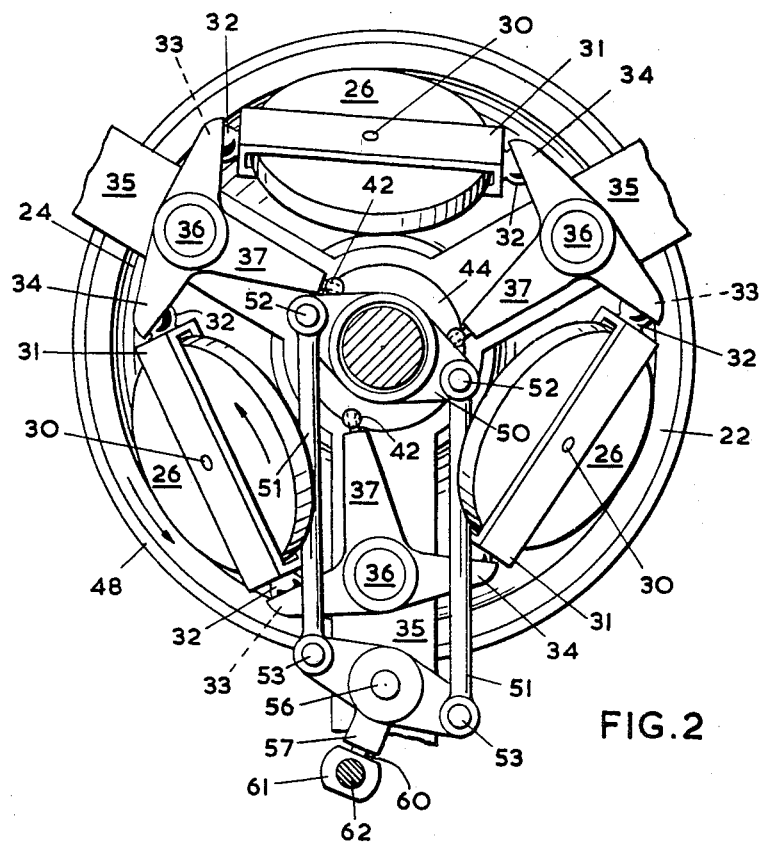

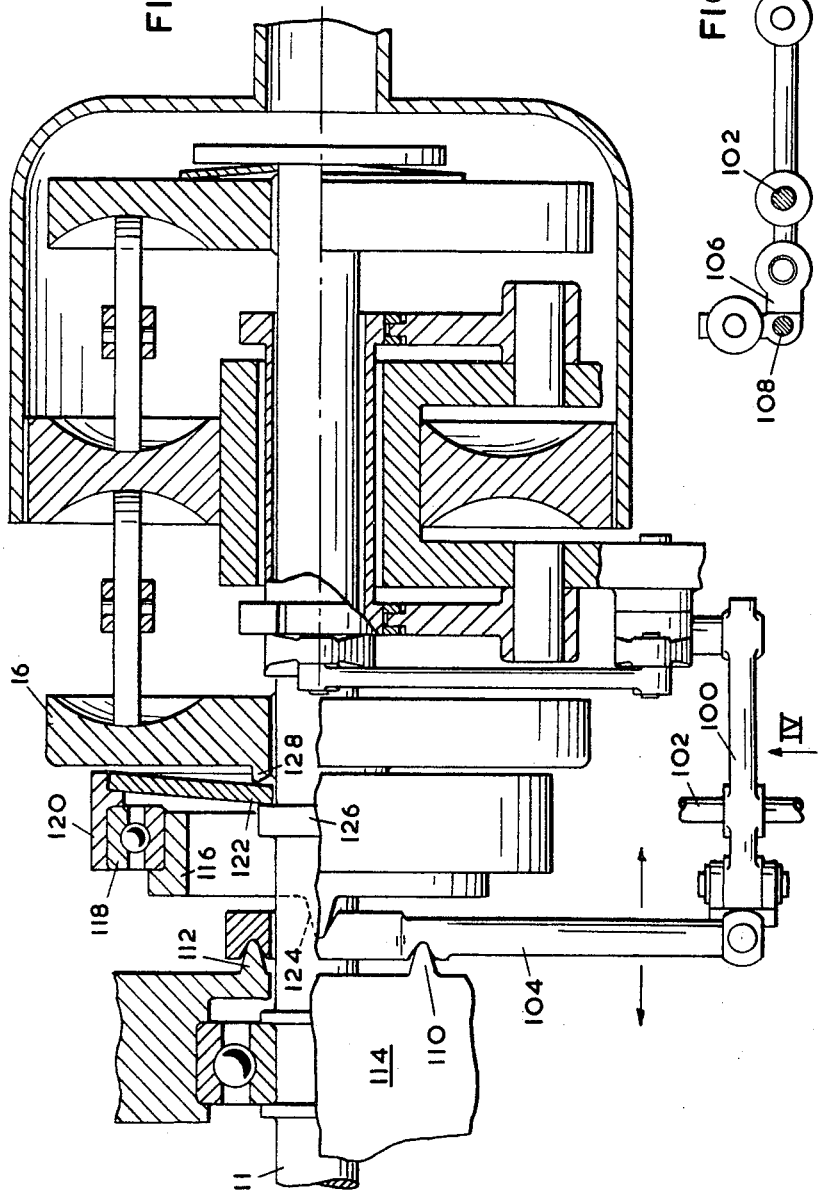
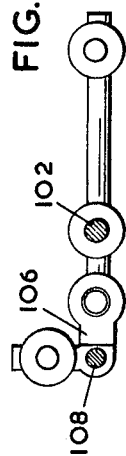

3,412,622
VARIABLE-RATIO FRICTIONAL DRIVES
Richard Nelson Rhodes and Clifford Raymond Schofield, Bradford, England, assignors to The English Electric Company Limited, London, England, a British company
Filed Feb. 21, 1967, Ser. No. 617,688
Claims priority, application Great Britain, Feb. 24, 1966, 8,296/66
10 Claims. (Cl. 74—200)

ABSTRACT OF THE DISCLOSURE

This invention is concerned with a double-ended variable-ratio frictional drive gear having rollers running between toroidal discs and controlled as to their tangential positions by a member which moves in response to the torque reaction on the rollers and which transmits, via a mechanical thrust-amplifying device preferably including a cam, the necessary axial force urging the toroidal discs together. This invention enables the axial force to be exerted on the toroidal disc without the usual need for a heavy thrust bearing.

---

Figure 1:
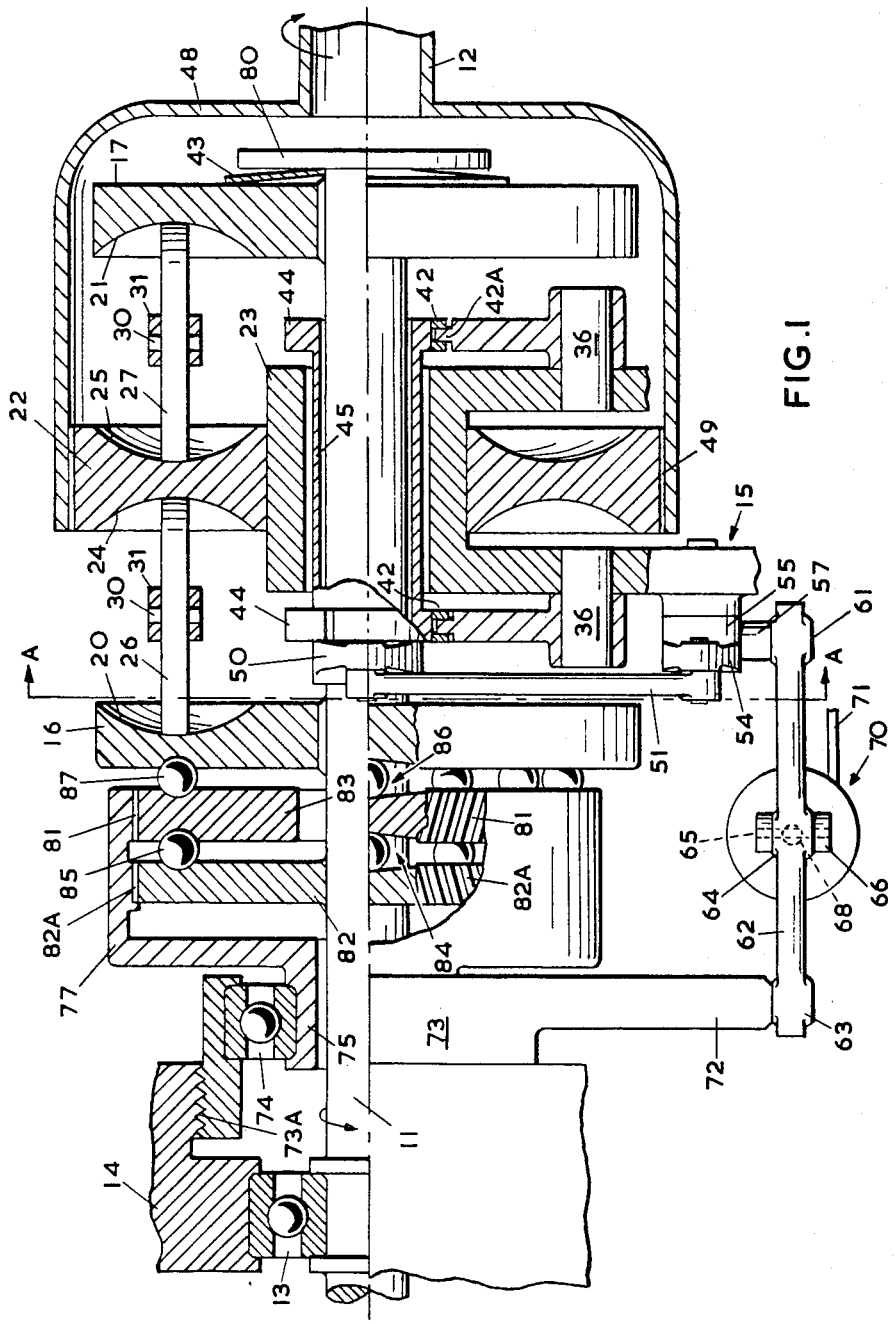

This invention is concerned with variable-ratio frictional drive gears of the kind comprising basically two axially spaced torus discs between which there is a set of drive rollers in frictional rolling contact with toroidal surfaces on the discs, each roller being rotatably mounted in a roller carriage.

The drive ratio is varied by tilting the roller carriages so as to vary the distances from the gear axis at which the rollers engage respectively the two discs. One way of changing the ratio angle of the rollers (that is to say the angle of tilt which determines the drive ratio of the gear) is by bodily moving the roller carriages, preferably substantially tangentially with respect to the gear axis, and by allowing the rollers then to tilt themselves to change the ratio angle. This invention is concerned specifically with gears of this general construction, which will be referred to as "gears of the kind described".

This invention is particularly concerned with gears in which the plane of each roller normal to the axis of rotation of the roller and passing through points of contact of the roller with the two opposed torus discs contains the axis about which the roller tilts and is tangential to the torus centre circle (i.e. the locus of the centre of the circle of revolution generating the torus), as distinct from gears in which the same plane for each roller is closer to the main axis of rotation of the gear. The first arrangement requires substantially symmetrical rollers (and may accordingly be referred to as a "symmetrical-roller" gear) as opposed to the second arrangement, which requires approximately frusto-conical gears.

This invention is specifically concerned with gears referred to commonly as "double-ended gears." In such gears there are two sets of rollers and three aixally spaced torus discs. One set of rollers lies between the middle disc and one end disc, and the other set of rollers lies between the middle disc and the other end disc. The two end discs rotate together with a central shaft passing through all three discs. In theory there may be more sets of rollers (that is to say, any even number of sets), the only criterion as regards suitability for this invention being that the end discs should both rotate with the central shaft, but a gear with only two sets of rollers is preferred and the invention will therefore be described with reference to such an arrangement. Nevertheless the expression "double-ended gear" is intended to cover gears with more than two sets of rollers.

One of the factors affecting the operation and working life of a frictional drive gear is the axial loading by which the end discs are urged together to provide the necessary driving reaction with the rollers. If the axial loading is too small, slipping of the rollers on the discs occurs and the required torque is not transmitted by the gear. Too large an axial loading results in early fatigue. For long life and satisfactory operation the axial loading provided at any given torque should, as far as possible, be set at the minimum value needed for transmitting properly that particular torque. This invention is concerned with providing the appropriate axial loading mechanically.

According to this invention a double-ended variable-ratio frictional drive gear of the kind described has two thrust-bearing collars on the central shaft between which the torus discs lie; a control member which controls the positions of the roller carriages in the sense affecting the ratio angle of the rollers and which tends to be angularly displaced owing to the torque reaction imposed upon it by the roller carriages; a thrust member connected to the control member via a linkage including means for providing external control over the angular position of the control member (and consequently over the ratio angle of the rollers), the thrust member being displaced in one direction or the other by the control member depending upon whether the torque reaction increases or decreases; and a thrust-amplifying device which rotates with the central shaft and receives a thrust from the thrust member, which thrust increases during use when the torque reaction increases, and decreases when the torque reaction decreases, the thrust from the thrust member being transmitted to the adjacent torus disc by the thrust-amplifying device at an amplified amplitude, part of the reaction of the thrust-amplifying device back from the torus disc being borne by the adjacent collar on the central shaft.

This invention avoids the usual need for a heavy thrust bearing between one of the end torus discs and the means applying the necessary axial load to that disc. In a gear according to this invention a relatively light thrust bearing can be used between the thrust member and the thrust-amplifying device, because the full axial load does not have to be transmitted at this particular point in the gear. Where the full axial load is transmitted, that is to say between the force-amplifying device and the adjacent torous disc, there is no relative rotation (because the thrust-amplifying device rotates with the central shaft, as well as the end torus discs), so no thrust bearing is needed.

Examples of symmetrical roller gears according to this invention are shown in the accompanying drawings. In these drawings:

FIGURE 1 is a partly sectioned side view of one gear;
FIGURE 2 is a section on the line A—A in FIGURE 1; and
FIGURE 3 is similar to FIGURE 1 but shows a modified form of thrust-amplifying device; and
FIGURE 4 shows a detail as viewed in the direction of the arrow IV in FIGURE 3.

The gear in each example consists basically of two end torus discs 16 and 17 which are splined to a central input shaft 11, and a middle torus disc 22 splined to a drum 48 connected to an output shaft 12. Between the torus discs there are two sets of rollers 26 and 27 in frictional engagement with toroidal surfaces 20, 21, 24 and 25 on the torus discs; each set of rollers consists of three rollers mounted by pins 30 in roller carriages 31, as shown in FIGURE 2.

The roller carriages are supported by T-shaped rockers 37 (see FIGURE 2) which have sliding connections with pins 42 at their inner ends 42A by which they are pivoted in recesses in enlarged end portions 44 of a sleeve 45 which serves as a control member. The arms of the rockers 37 have part-spherical recesses which receive corresponding ball end pieces 32 on the roller carriages. The rockers are pivotally mounted by pins 36 on radial arms 35 of a stationary supporting spider member 23. By this arrangement, when the rockers pivot about the pins 36, as a result of angular displacement of the sleeve 45, the roller carriages move approximately in tangential directions with respect to the torus discs. Tangential movement results in the rollers steering themselves towards a different ratio angle, that is to say, a different angle of inclination of the roller axes with respect to the axis of the torus discs; stabilisation of the ratio angle change is achieved in a known manner by means of an appropriate castor angle, this being a small angle (for example of the order of 5° to 15°) by which the centre line of each roller carriage is inclined to a plane normal to the axis of the torus discs. As a result of the castor angle, when the sleeve 45 is displaced angularly so as to move the roller carriages tangentially, each roller carriage and roller tilts about the centre line of the roller carriage so as to change the ratio angle by an amount directly dependent upon the amount of tangential movement. It will be appreciated that the rollers of the two sets must tilt in opposite directions, so the castor angles of the two sets are in opposite senses.

Other arrangements for supporting the roller carriages by means of the rockers 37 are possible. For example, each roller carriage may have one of its ball ends 32 forming ball-and-socket connection with the corresponding rocker arm for controlling tangential movement in both directions, the other ball end being slidably supported in a cylindrical recess in its corresponding rocker arm. Moreover, the movement of the roller carriages due to angular displacement of the control sleeve may be made more nearly purely tangential by increasing the distance between the centres of the ball ends of each roller carriage to equal the distance between the axes of the rocker pivot pins 36.

A slight radial clearance between the shaft 11, sleeve 45 and spider 23 allows the sleeves 45 a slight freedom of movement by which the loads on the various rollers are equalised.

The shaft 11 has two collars 80 and 82 between which the torus discs lie. Between the collar 80 and the adjacent torus disc 17 there is a Belleville washer 43 which maintains a slight initial load by which the torus discs are pressed against the rollers without the operation of the thrust member. When the shaft 11 is driven, the torque reaction on the roller carriages moves the roller carriages substantially tangentially and this produces a rotary movement of the sleeve 45. As a consequence a lever 62 is tilted about a fulcrum 65 and thus angularly displaces a thrust member 73 by acting through an arm 72 on the thrust member. It will be seen from FIGURE 2 that the lever 62 is connected to the sleeve 45 by parallel links 51, with pivot pins 52 and 53, via a bellcrank 57 pivoted to one of the spider arms by a pin 56. The bellcrank incorporates a swivel joint including a swivel axle 60 to allow the necessary freedom of movement.

The thrust member 73 has a screw thread 73A engaging a matching thread in a part 14 of the stationary housing of the gear. Accordingly, angular displacement of the thrust member results in an axial movement which is transmitted via a ball bearing 74 (acting as a light thrust bearing) to a sleeve member 75 which has a part 77 of enlarged diameter connected to the collar 82 by a spline 82A and connected also to a cam member 83 by a spline 81. The sleeve member 75 and cam member serve basically as a thrust amplifying device. At least one of the splines is a helical spline at an angle of up to 15°; the other spline is either straight or is helical and of opposite hand to the first spline. As a result, axial movement of the member 75 results in the cam member 83 being rotated slightly with respect to the collar 82 and also with respect to the adjacent torus disc 16. Balls 85 and 87 lying in tapered circumferential grooves 84 and 86 between the cam member and the members 82 and 16 transmit an amplified axial thrust to the disc 16 when the cam member 83 is rotated with respect to the disc 16 and collar 82, the major proportion of the thrust on the torus disc 16 being reacted onto the collar 82 and a relatively small proportion being reacted onto the sleeve member 75. Consequently the ball bearing 74 does not have to bear a heavy axial load.

When the gear is at rest, each ball may be at the widest part of a tapering space between the cam member 83 and the member 16 or 82, each space being tapered in both directions from its widest point, so that rotation of the cam member 83 in either direction results in a thrust being applied to the torus disc 16. The amount of thrust is determined by the axial movement of the thrust member 75 and this in turn is determined by the amount of displacement of the roller carriages. In this way displacement of the roller carriages is resisted by the cam mechanism (and also to some extent by the Belleville washer 43) while at the same time the thrust applied to the torus disc 16 by the cam mechanism is dependent upon the torque reacted onto the sleeve 45 by the roller carriages, this last torque being dependent in turn upon the output load on the shaft 12 of the gear. As the load on the shaft 12 increases, so the displacement of the roller carriages increases with a consequent increase in the thrust applied by the cam mechanism so as to meet the additional loading requirement on the rollers.

Overall adjustment of the ratio angle of the rollers is allowed for by an adjustment of the position of the fulcrum pin 65. For this purpose the fulcrum pin 65 may for example be supported in a yoke 66 at the end of a piston rod 68 of a piston and cylinder device 70, movement of the piston rod (with consequent adjustment in the ratio angle of the gear) being controlled by hydraulic pressure supplied through a pipe 71. The piston and cylinder device 70 is, however, shown only for the purpose of illustration; the fulcrum pin may equally well be controlled by an electric servo-mechanism, and indeed one advantage in the present invention is that it can be used if necessary without any form of hydraulic control.

The device 70 or an equivalent electric servo-mechanism or mechanical or pneaumatic servo-device may be controlled automatically in response to the output or input torque or speed so as to maintain any of these factors constant as may be required in any particular application.

The gear shown in FIGURES 3 and 4 differs in the manner in which torque reacted from the roller carriages is transmitted to the thrust-amplifying device. The lever 62 of FIGURE 1 is replaced by a lever 100 which is pivoted on a pin 102 (which may be carried by a piston rod or electrically controlled rod in the manner of the pin 65 in FIGURE 1) and transmits a swinging movement to a thrust member in the form of a lever 104 via a bellcrank 106 pivoted on a stationary pin 108.

The thrust lever 104 swings about one of two fulcrums 110 and 112 on a stationary housing member 114, depending upon the direction of torque transmission. However, no matter in which direction the lever 104 swings from the neutral position shown in FIGURE 3, it thrusts to the right a sleeve 116 which applies the thrust via a ball bearing 118 to a thrust-amplifying device constituted by a sleeve 120 and a frusto-conical member 122. Thrust is transmitted to the sleeve 116 at a projection 124, the distances between the projection 124 and the fulcrums 110 and 112 being so arranged that a given force transmitted to the lever 104 by the bellcrank 106 gives rise to the same force on the projection 124, regardless of the direction in which the lever 104 swings.

The frusto-conical member 122 is somewhat like a Belleville washer. The thrust-amplifying action is best understood if the member 122 is regarded as a series of radial levers, and indeed the member 122 can be replaced by a series of radial levers. The inner end of each radial lever butts against a collar 126 on the shaft 11 and serves as a fulcrum about which the lever is tilted by the sleeve 120 so as to apply an amplified thrust to an annular projection 128 on the torus disc 16. The member 122 may be formed with radial slots extending outwards from its inner edge or inwards from its outer edge.

We claim:

1. A double-ended variable-ratio drive gear comprising a central shaft; a middle torus disc member rotatably mounted on the central shaft and formed on its opposite faces with toroidal surfaces; two end torus disc members mounted on the central shaft for rotation with the central shaft, on opposite sides of the middle torus disc member, and formed with toroidal surfaces facing towards the middle disc member; two collars fixed to the shaft and lying respectively adjacent the two end torous disc members on the sides remote from the middle torus disc member; two sets of driving rollers mounted respectively on opposite sides of the middle torus disc member, each roller being pivotally mounted on a roller carriage and being in frictional rolling contact with the opposed toroidal surfaces on the respective torus disc members; means pivotally supporting the roller carriages while allowing bodily movement of the roller carriages away from a central position whereby the rollers can tilt themselves into different ratio angles; a control member which controls the positions of the roller carriages in the sense affecting the ratio angle of the rollers and which tends to be angularly displaced owing to the torque reaction imposed upon it by the roller carriages; a thrust member connected to the control member via a linkage including means for providing external control over the angular position of the control member, the thrust member being displaced increasingly away from an initial position by the control member in response to an increase in the torque reaction; and a thrust-amplifying device which rotates with the central shaft and receives a thrust from the thrust member, which thrust increases during use when the torque reaction increases, and decreases when the torque reaction decreases, the thrust from the thrust member being transmitted to the adjacent torus disc member by the thrust-amplifying device at an amplified amplitude, at least part of the reaction of the thrust-amplifying device back from the torus disc being borne by the adjacent collar on the central shaft.

2. A gear according to claim 1 in which the linkage through which the thrust member is connected to the control member includes a lever pivoted on a fulcrum pin which is carried by a movable member by which the ratio angle of the gear is externally controllable.

3. A gear according to claim 2 in which the movable member is controlled automatically by a mechanism responsive to input or output torque or speed.

4. A gear according to claim 1 in which the rollers are set at a camber angle whereby the ratio angle is directly dependent upon the position of the control member.

5. A gear according to claim 1 in which the control member is in the form of a sleeve around the central shaft of the gear, and in which the means pivotally supporting the roller carriages comprise rockers having inwardly extending arms pivotally connected at their inner ends to the sleeve.

6. A gear according to claim 1 in which the thrust member is formed with a screw thread in threaded engagement with a corresponding screw thread formed in a stationary member and is connected by means causing it to rotate as a consequence of movement of the control member, the resulting axial movement of the thrust member owing to the screwing action being transmitted to the thrust-amplifying device.

7. A gear according to claim 1 in which the thrust-amplifying device comprises a sleeve member which receives thrust from the thrust member and has spline means connecting it to a cam member lying between the adjacent torus disc and its co-operating collar on the central shaft, whereby the cam member is rotated with respect to the central shaft as a consequence of axial movement of the sleeve member, such rotational movement producing a thrust from the cam member onto the torus disc, which thrust is reacted back at least partly onto the collar.

8. A gear according to claim 7 in which the sleeve member of the thrust-amplifying device also has a spline-like connection with the collar by which the sleeve member is constrained to rotate with the central shaft.

9. A gear according to claim 8 in which thrust is transmitted from the cam member to the torus disc and is reacted back to the collar through balls or rollers lying in circumferentially tapering spaces between the members concerned.

10. A double-ended variable-ratio drive gear comprising a central shaft; a middle torus disc member rotatably mounted on the central shaft and formed on its opposite faces with toroidal surfaces; two end torus disc members mounted on the central shaft for rotation with the central shaft, on opposite sides of the middle torus disc member, and formed with toroidal surfaces facing towards the middle disc member; two collars fixed to the shaft and lying respectively adjacent to the two end torus disc members on the sides remote from the middle torus disc member; two sets of driving rollers mounted respectively on opposite sides of the middle torus disc member, each roller being pivotally mounted on a roller carriage and being in frictional rolling contact with the opposed toroidal surfaces on the respective torus disc members; a control sleeve mounted around the central shaft; rocker members pivoted to a fixed spider member on pins lying parallel to the central shaft, each rocker member having an inwardly directed arm which is pivoted at its inner end to the control sleeve and being formed each with universal support means for one end of each of two adjacent roller carriages whereby angular movement of the control sleeve produces substantially tangential movement of the roller carriages, the positions of the universal support means at the opposite ends of each roller carriage being offset from one another, axially of the central shaft, whereby each roller carriage pivots about an axis inclined to a plane normal to the axis of the central shaft to change the roller ratio angle, the amount of ratio angle change consequently being determined substantially by the amount of tangential movement of the roller carriages; a thrust member operatively connected to the control sleeve for applying an axial force towards one of the end torus disc members in response to angular movement of the control sleeve caused by the torque reaction of the roller carriages onto the control sleeve; and a thrust-amplifying device which rotates with the central shaft and receives a thrust from the thrust member, which thrust increases during use when the torque reaction increases, and decreases when the torque reaction decreases, the thrust from the thrust member being transmitted to the adjacent torous disc member by the thrust-amplifying device at an amplified amplitude, at least part of the reaction of the thrust-amplifying device back from the torus disc being borne by the adjacent collar on the central shaft.

References Cited

UNITED STATES PATENTS

| | | | |
|---|---|---|---|
| 2,446,409 | 8/1948 | Chilton | 74—200 |
| 2,493,571 | 1/1950 | Chilton | 74—200 |
| 2,984,118 | 5/1961 | De Brie Perry | 74—200 |
| 3,165,937 | 1/1965 | Tomaszek | 74—200 XR |

C. J. HUSAR, *Primary Examiner.*